(12) United States Patent
Gillenberg et al.

(10) Patent No.: US 8,287,612 B2
(45) Date of Patent: *Oct. 16, 2012

(54) FILTER ELEMENT AND FILTER SYSTEM

(75) Inventors: Eric Gillenberg, Speyer (DE);
Friedrich Kupfer, Poxau (DE);
Klaus-Dieter Ruhland, Meckenheim (DE); Oliver Steins, Römerberg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,397

(22) Filed: Mar. 25, 2012

(65) Prior Publication Data

US 2012/0210683 A1    Aug. 23, 2012

Related U.S. Application Data

(63) Continuation of application No. 12/680,978, filed as application No. PCT/EP2008/063202 on Oct. 2, 2008, now Pat. No. 8,142,533.

(30) Foreign Application Priority Data

Oct. 2, 2007   (DE) .................... 20 2007 013 822 U

(51) Int. Cl.
*B01D 50/00* (2006.01)

(52) U.S. Cl. ............. 55/337; 55/428; 55/429; 55/343; 55/345; 55/482; 55/528; 55/424; 55/426; 55/DIG. 3; 15/347; 15/352; 15/353; 96/15; 96/54; 96/57

(58) Field of Classification Search .............. 55/337, 55/428, 429, 343, 345, 482, 528, 424, 426; 15/347, 352, 353; 96/15, 54, 57

See application file for complete search history.

(56) References Cited

U.S. PATENT DOCUMENTS

| | | | | |
|---|---|---|---|---|
| 5,413,712 | A * | 5/1995 | Gewiss et al. | 210/450 |
| 5,487,767 | A * | 1/1996 | Brown | 55/357 |
| 5,569,311 | A * | 10/1996 | Oda et al. | 55/493 |
| 5,702,602 | A * | 12/1997 | Brown et al. | 210/342 |
| 5,730,769 | A * | 3/1998 | Dungs et al. | 55/385.3 |
| 5,755,843 | A * | 5/1998 | Sundquist | 55/385.3 |
| 5,893,937 | A * | 4/1999 | Moessinger | 55/385.3 |
| 5,954,849 | A * | 9/1999 | Berkhoel et al. | 55/498 |
| 6,179,890 | B1 * | 1/2001 | Ramos et al. | 55/482 |
| 6,447,567 | B1 * | 9/2002 | Ehrenberg | 55/498 |
| 6,598,580 | B2 * | 7/2003 | Baumann et al. | 123/198 E |
| 6,599,342 | B2 * | 7/2003 | Andress et al. | 55/495 |
| 6,610,126 | B2 * | 8/2003 | Xu et al. | 95/273 |
| 6,936,162 | B1 * | 8/2005 | McKenzie | 210/130 |
| 6,966,940 | B2 * | 11/2005 | Krisko et al. | 55/497 |
| 6,972,092 | B1 * | 12/2005 | Roll | 210/313 |
| 7,303,673 | B1 * | 12/2007 | Glazewski | 210/232 |
| 7,318,851 | B2 * | 1/2008 | Brown et al. | 55/498 |

(Continued)

*Primary Examiner* — Jason M Greene
*Assistant Examiner* — Dung H Bui
(74) *Attorney, Agent, or Firm* — James Hasselbeck

(57) ABSTRACT

A filter element has of a filter medium (10) folded in a zig-zag manner and designed in a tubular shape. End plates (11, 12) are arranged on the filter medium end faces. End plate (12) has a concentric opening as well as a first annular ring (14) and a second annular ring (15), and a sealing groove (16) arranged between the rings. A reinforcement plate (17) is arranged at the end plate and has an annular surface (23) extending in axial direction across folds of the filter element.

18 Claims, 3 Drawing Sheets

U.S. PATENT DOCUMENTS

| | | | |
|---|---|---|---|
| 7,393,375 B2* | 7/2008 | Xu et al. | 55/495 |
| 7,396,376 B2* | 7/2008 | Schrage et al. | 55/498 |
| 7,396,377 B2* | 7/2008 | Lampert et al. | 55/502 |
| 7,491,254 B2* | 2/2009 | Krisko et al. | 55/337 |
| 7,608,184 B2* | 10/2009 | Weindorf et al. | 210/234 |
| 7,658,777 B2* | 2/2010 | Kopec et al. | 55/502 |
| 7,662,203 B2* | 2/2010 | Scott et al. | 55/498 |
| 2002/0112459 A1* | 8/2002 | Andress et al. | 55/498 |
| 2003/0121242 A1* | 7/2003 | Rieger et al. | 55/493 |
| 2005/0194312 A1* | 9/2005 | Niemeyer et al. | 210/634 |
| 2005/0229561 A1* | 10/2005 | Nepsund et al. | 55/481 |
| 2006/0091061 A1* | 5/2006 | Brown | 210/440 |
| 2006/0137316 A1* | 6/2006 | Krull et al. | 55/498 |
| 2006/0157394 A1* | 7/2006 | Luka et al. | 210/136 |
| 2006/0219626 A1* | 10/2006 | Dworatzek et al. | 210/443 |
| 2007/0170101 A1* | 7/2007 | Stanhope et al. | 210/130 |
| 2007/0186528 A1* | 8/2007 | Wydeven et al. | 55/498 |
| 2007/0193929 A1* | 8/2007 | Brown | 210/90 |
| 2007/0235374 A1* | 10/2007 | Wright et al. | 210/130 |
| 2007/0235375 A1* | 10/2007 | Stanhope et al. | 210/130 |
| 2008/0035537 A1* | 2/2008 | Klein et al. | 210/94 |
| 2008/0066435 A1* | 3/2008 | Engel et al. | 55/492 |
| 2008/0276583 A1* | 11/2008 | Munkel | 55/498 |
| 2010/0032359 A1* | 2/2010 | Gillenberg et al. | 210/232 |

* cited by examiner

FILTER ELEMENT AND FILTER SYSTEM

CROSS REFERENCE TO RELATED APPLICATIONS

The present application is a Continuation of U.S. patent application Ser. No. 12/680,978 filed Jun. 21, 2010, the entire disclosure of which is incorporated herein by reference. U.S. Ser. No. 12/680,978 is a US National Stage Entry of international patent application no. PCT/EP2008/063202, filed Oct. 2, 2008 designating the United States of America, the entire disclosure of which is incorporated herein by reference. Priority is claimed based on Federal Republic of Germany patent application no. 20 2007 013 822.9, filed Oct. 2, 2007.

TECHNICAL FIELD

The invention concerns a filter element and a filter system, especially for the intake air of an internal combustion engine.

PRIOR ART

U.S. Pat. No. 4,720,292 discloses an air filter having the following features: a housing with an axial outlet opening and a substantially open second end that is closable by a removable cover. On the circumference of the housing an air inlet opening is arranged. In the housing, there is a substantially cylindrical filter element with an internal support tube, a filter with an external support tube, wherein the filter element is coaxially arranged in the housing. The sealing action of the filter element on the housing is realized by an annular end plate that has a substantially cylindrical radially inwardly oriented surface and is pushed over an inner section of the outlet part.

It is well known that the filter inserts of air filters are exchanged after a certain operating time. Depending on the dust load, the service life of an air filter can be a few days (construction machinery) up to several months.

The filter insert disclosed in the aforementioned U.S. patent as well as other conventionally employed filter inserts are comprised of a combination of materials wherein, in particular for the support tubes, sheet steel or plastic material is used. The filter medium is paper or a plastic nonwoven fabric. The end plates are comprised of plastic material, for example, of a soft elastomer.

Especially in case of frequent exchange of filter elements the reliable and process-safe sealing action of the filter element in a housing is important. The sealing action should be temperature-resistant and vibration-resistant. Even in facilities or devices that are exposed to strong vibrations or shocks, the sealing action of the filter element must be ensured. At the same time, the filter element itself however should have, if possible, no metallic elements so that it can be disposed thermally without problems.

SUMMARY OF THE INVENTION

The invention has therefore the object to provide a filter element and a filter system with a high filtration property and a reliable sealing action between the area of the unfiltered and the area of the filtered medium. This object is solved by the features of the independent claim.

The decisive advantage of the invention resides in that by the configuration of the seals of the filter element with two annular bead-shaped arrangements and an intermediately positioned sealing groove it is ensured that, on the one hand, a high sealing action and, on the other hand, a good support action of the filter element in a housing are provided. Especially in case of use of plastic material for the sealing action on vibration-loaded elements, a design is required that functions reliably even in case of extreme temperature fluctuations.

According to one embodiment of the invention, the end plate that supports the seal is comprised of polyurethane. Of course, there is also the possibility to manufacture the end plate of a soft elastomer or of several components, for example, by an in-mold assembly injection molding process, wherein the component that forms the seal is comprised of an elastomer and the component that produces the connection to the filter medium is a thermoplastic material. The latter can be welded or glued to the filter medium.

In a further embodiment of the invention, it is proposed to provide the reinforcement plate that is arranged within the end plate with perforations These perforations enable penetration of polyurethane during manufacture of the filter element and produce in this way an intimate, positive-locking connection between filter medium and sealing contour and reinforcement plate.

According to a further embodiment the reinforcement plate is provided in the area that extends past the polyurethane foam with an annular surface or a cylindrical annular wall. It extends across the folds of the filter medium, for example, across an area of 0 to 30% of the total length of the filter element and protects thus the folds in case of improper handling or, for example, when knocking off dirt or manually cleaning of the filter element.

According to one embodiment of the invention, the second end plate that is positioned opposite the sealing end plate can also be comprised of polyurethane foam and has a closure member made of a thermoplastic material that seals the interior of the filter element.

The end plates can be produced also by a thixotropic application method. This means a metered application of the thixotropic material wherein simultaneously the sealing structure is formed without additional molds.

The invention concerns also a filter system with a filter element. This filter system serves in particular for filtration of the intake air of an internal combustion engine and is comprised of a housing and a cover for receiving the filter element. Advantageously, the filter system is provided with two annular grooves that in the area of the sealing action communicate with the sealing contours of the filter element.

According to a further embodiment, on the housing in the area of the inlet a cyclone or rotary flow separator is provided. It is comprised of a guiding geometry that imparts a rotational movement to the medium. By means of this rotation the dirt is concentrated in the area of the housing wall and is removed at a suitable location by means of a dirt outlet.

According to a further embodiment of the invention, a secondary element is provided that is positioned in the interior of the filter system. The secondary element has the task to maintain the outlet of the filter system closed upon exchange of the filter element so that no dirt can penetrate into this area while the filter element is cleaned or replaced. The secondary element in a preferred embodiment is connected by means of a screw connection to the housing and provided with a seal relative to the housing.

These and further features may not only be taken from the claims, but also from the figure description and the figures.

BRIEF DESCRIPTION OF THE DRAWINGS

The invention will be explained in the following with the aid of an embodiment in more detail. It is shown in.

Figure 1:
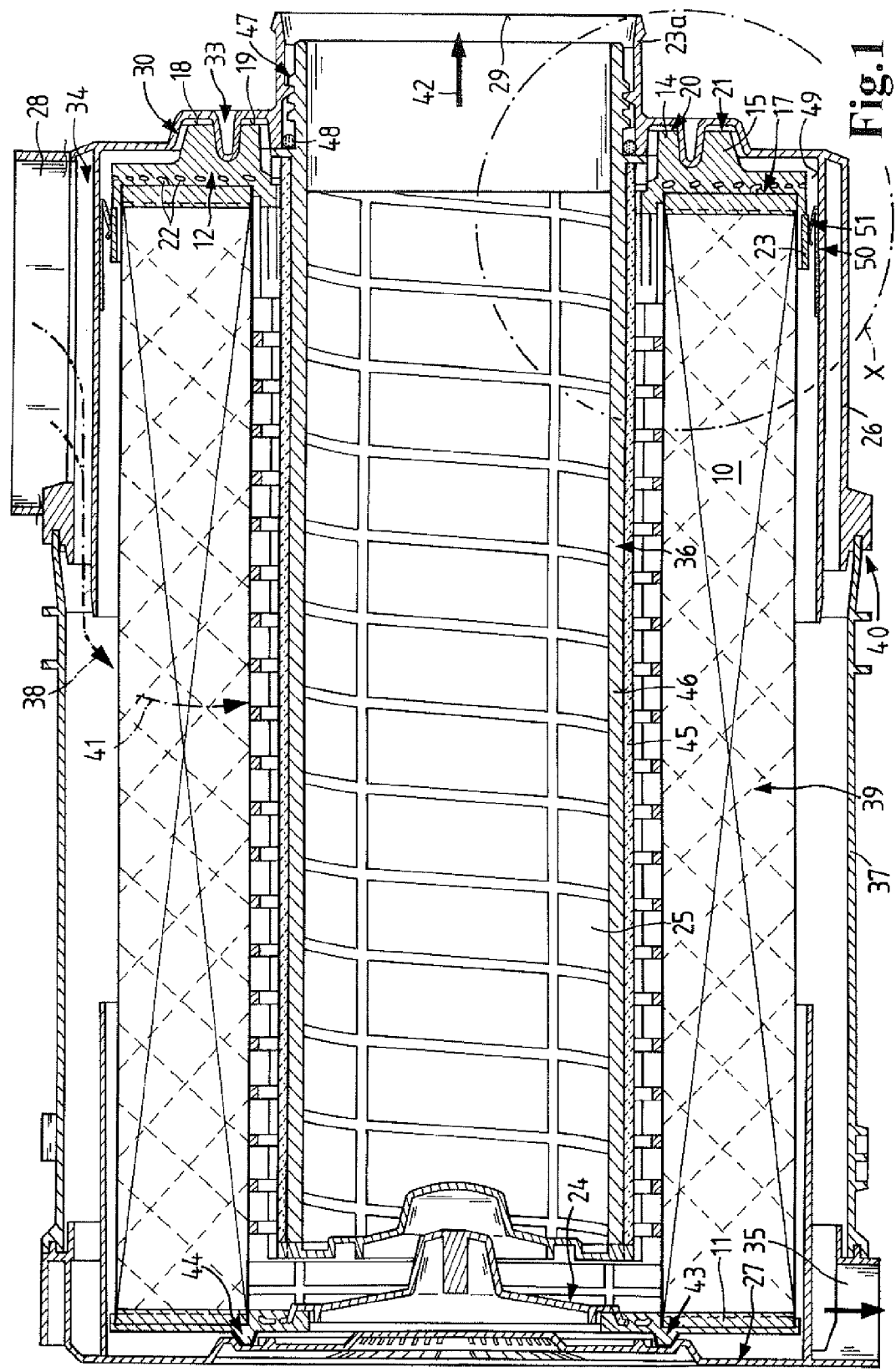
FIG. 1 a section view of a filter system.
Figure 1A:
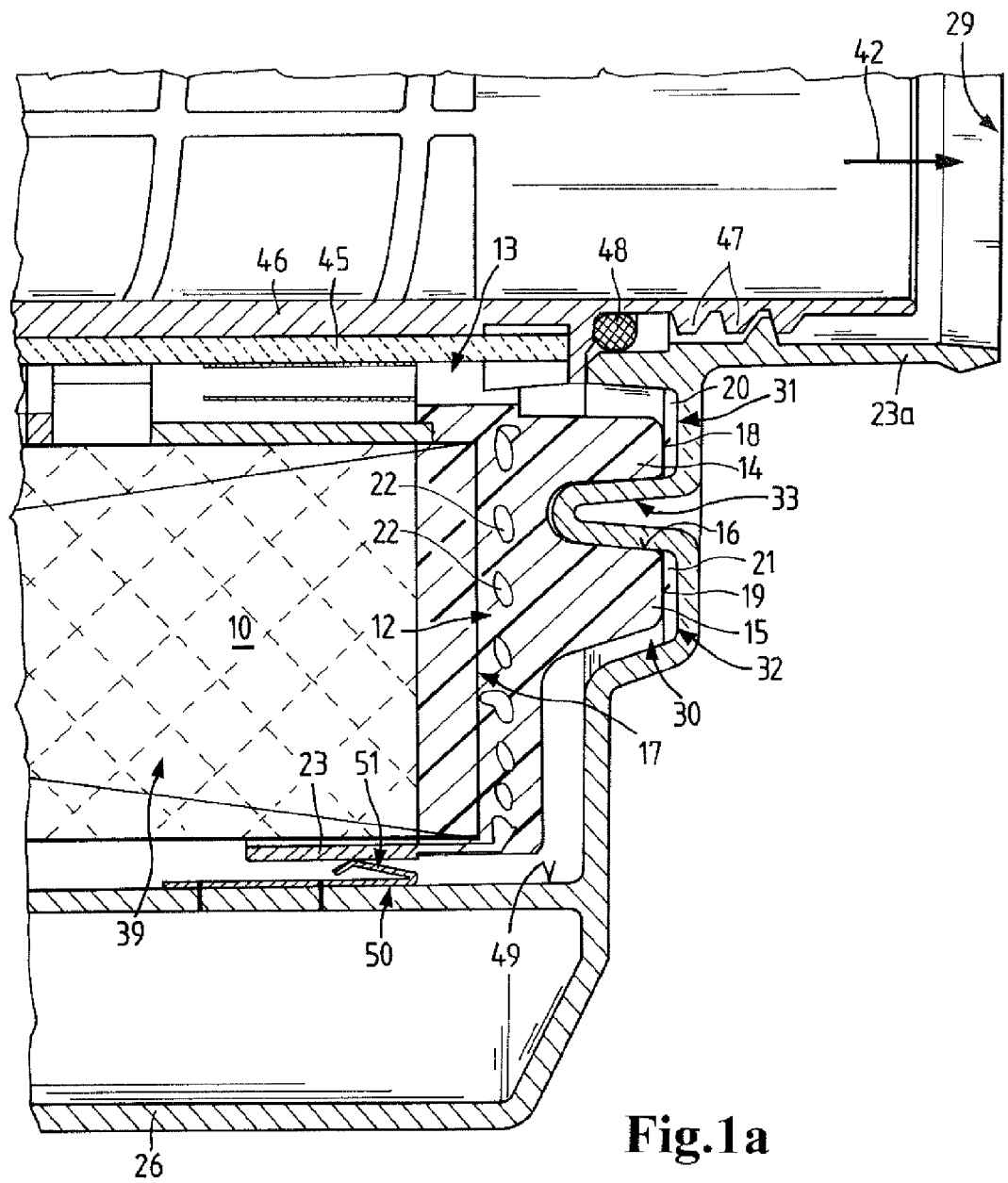

The filter system according to FIG. 1 is comprised of a housing 26 that is substantially concentrically configured and has an inlet 28. The filter system serves for filtration of the intake air of an internal combustion engine. Through the inlet 28 the air to be purified is supplied according to arrow 38, flows through the cyclone preseparator 34 and a rotary flow is imparted. As a result of this rotary flow particles that are contained in the air reach the housing wall and are carried from there to the exterior through a dirt outlet 35 that may be closed off by a suitable valve.

EMBODIMENT(S) OF THE INVENTION

On the housing 26 a middle section 37 is arranged. The latter is also designed concentrically and is coupled to the housing in the area 40, for example, by means of a weld. On the middle section 37 there is a cover 27. The latter is detachably connected to the middle section by means of clamping closures or another suitable closure system. Cover, middle section, and housing together thus provide a closed system that has an outlet 29 for discharging the purified air.

Inside the complete system there is a filter element 39. The latter is comprised of a zigzag-folded filter medium 10 and is of a concentric shape. The end faces of the filter element 39 have end plates 11, 12. While one end plate 12 has a concentric opening 13, the other end plate 11 is provided with a closure member 24. It is also possible to provide the additional end plate with a concentric opening that is closed off by a socket at the cover 27. The air to be purified flows according to arrow 41 through the filter element and, purified, according to arrow 42 through the outlet 29 to an internal combustion engine, not illustrated here. The filter element is provided at the end plate 12 arranged to the right with a first annular bead 14 and a second annular bead 15. Between them there is a sealing groove 16.

Inside the end plate 12 a reinforcement plate 17 is provided that has perforations 22. The reinforcement plate in the outer area, i.e., outside of the sealing compound area, is provided with an annular surface 23. It serves for shielding the filter medium or the element during assembly or knocking off dirt or other manipulations by hand.

The annular bead 14 as well as the annular bead 15 abut ribs 20, 21 and define thus the axial position of the filter element in the housing.

In an alternative embodiment that is not limited to this example, the position of the filter element can be defined by engagement of the annular beads 14 and 15 in annular grooves 31 and 32 without abutting the ribs 20, 21. Alternatively, other points can be used for additional axial and/or radial fixation.

Figure 2:
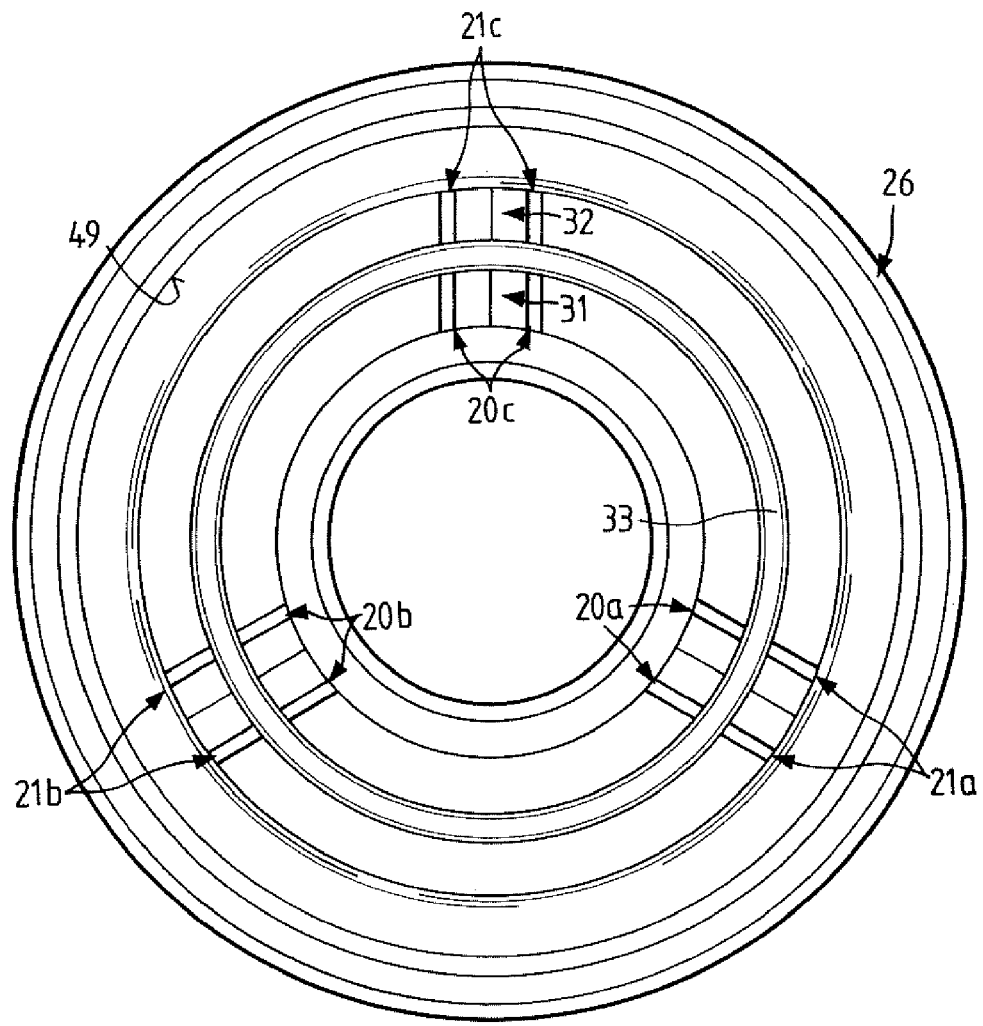
FIG. 2 a detail illustration in the sealing area of the filter housing.

The ribs are disclosed in detail in FIG. 2; they are so-called double ribs, i.e., two neighboring ribs 20a, 20b, 20c that are arranged at the groove bottom of annular groove 31 and at the bottom of the annular groove 32 are arranged and, for example, have a height of 3 to 6 mm.

The sealing stay 33 that is located between the two annular grooves has at its flanks the sealing area; here, the end plate 12 seals with its sealing groove 16. In this way, a double sealing principle by means of these two flanks is provided. The sealing groove 16 is slightly deeper than the sealing stay 33 so that a certain axial tolerance in this area is possible. As already mentioned, the end plate is comprised of polyurethane foam or another elastomer whose hardness is selected such that, on the one hand, the end plate can provide the required sealing forces and, on the other hand, it also ensures a good positioning action of the filter element in the filter housing. Because of the two-flank sealing action and the support of the annular beads 14, 15 on the ribs 20 a relatively minimal mounting force and also a minimal release force for exchanging the filter element are required.

In an alternative embodiment that is not limited to this example, the sealing stay 33 has at its axial end an additional sealing bead, for example, an annular structure that is extending on the sealing stay 33 and is oriented axially into the interior of the housing. In this way, an additional axial sealing action can be achieved—without great influence on the pressing force upon insertion of the filter element into the filter housing. This can be realized, for example, by a sealing bead that is thin in comparison to the sealing stay 33.

The end plate 11 is provided with support noses 43, 44. They are supported on the cover 27 and in this way ensure a satisfactory axial force in the direction of the end plate 12 and thus a reliable sealing action. In the end plate 12 a closure member 24 is embedded. It separates the raw air chamber from the filtered air chamber. Within the filter element there is a secondary element 36 that surrounds the interior 25. The purified air flows through the secondary element that conventionally is provided with a nonwoven fabric cover 45. The nonwoven fabric cover is attached to a thermoplastic or metallic base member 46. The secondary element 36 is attached by means of a thread 47 to the outlet socket of the outlet 29 and at the same time is sealed by means of an O-ring 48 in this area.

The housing 26 is provided with an inner wall 49. This inner wall has a minimal spacing relative to the annular surface 23. On the inner wall a clamping element 50 according to FIG. 3 is provided.

This clamping element is comprised of spring steel that is shaped at several locations and projects into the mounting space of the filter element. The shaped locations are shown in FIG. 1 and identified by reference numeral 51. Upon insertion of the filter element the shaped locations are forced outwardly and serve for centering the filter element. Inasmuch as a filter element without the annular surface 23 is inserted into the housing, there is no possibility for centering the filter element. In this case, possibly the filter element or filter medium would be damaged. Therefore, the clamping element serves as a protection against accidental mounting of a wrong or faulty filter element.

The invention claimed is:

1. A filter element, comprising:
   a zigzag-folded filter medium (10) arranged in a tubular concentric shape;
   a first end plate (11) arranged at an axial end face of said concentric filter medium, said first end plate having a central portion that is either open or closed; and
   a second end plate (12) arranged at an opposing axial end face of said filter medium;
   wherein said second end plate (12) includes a concentric opening (13) therethrough, said second end plate extending substantially in a circular ring-shape about end face folds of the filter medium;
   wherein said second end plate (12) includes an outwards facing ring face including a first annular bead (14) extending axially outwards from said second end plate in a direction axially away from said filter element;
   wherein the second end plate (12) further includes a reinforcement plate (17) arranged at said opposing axial end face in an area between the said filter medium end face and said annular bead, wherein the reinforcement plate has an annular surface (23) extending in axial direction outwardly across the filter element wherein said outwards facing ring face of said second end plate (12) includes a sealing groove (16) formed in said ring face.

2. The filter element according to claim 1, wherein said annular surface (23) is operable to center said filter element with a filter housing configured to receive said filter element by engaging against a clamping element (50) provided on an inner wall of said filter housing.

3. The filter element according to claim 1, wherein said second end plate (12) has a second annular bead (15) extending axially outwards from said second end plate (12) in a direction axially away from said filter element, said second annular bead (15) concentrically spaced from said annular bead (14).

4. The filter element according to claim 3, wherein said annular beads have facing sidewalls defining said sealing groove (16) therebetween.

5. The filter element according to claim 1, wherein said annular bead (14) includes at least one outer end face (18, 19), said at least one outer end face (18, 19) is configured to be supportively received against support ribs (20,21) provided in a housing configured to receive said filter element.

6. The filter element according to claim 1, wherein said second end plate (12) is comprised of polyurethane foam or an elastomer.

7. The filter element according to claim 6, wherein said reinforcement plate (12) extends past said polyurethane foam of said second end plate with an annular surface or a cylindrical annular wall.

8. The filter element according to claim 7, wherein said extending reinforcement plate (12) extends across and overlays folds of a radially outwardly side of said filter medium.

9. The filter element according to claim 8, wherein said reinforcement plate overlaying said outwardly side extends across 0 to 30% of a total length of said filter element and protects thus said folds against knocking or impact such as due to knocking off dirt or manually cleaning of said filter element.

10. The filter element according to claim 6, wherein said reinforcement plate has perforations (22) operable to support flow of polyurethane foam providing a positive-locking connection between said filter medium and said reinforcement plate.

11. The filter element according to claim 1, wherein said first end plate (11) is comprised of polyurethane foam and has a concentrically arranged closure member (24) that seals an interior space (25) of the filter element (10) in the area of said first end plate.

12. The filter element according to claim 1, wherein said first end plate includes
an outwards facing ring face including a first annular bead extending axially outwards from said first end plate in a direction axially away from said filter element;
a second annular bead extending axially outwards from said first end plate in a direction axially away from said filter element, said second annular bead of said first end plate concentrically spaced from said first annular bead of said first end plate;
wherein said annular beads of said first end plate have facing sidewalls defining a sealing groove therebetween on said first end plate.

13. A filter system with a filter element according to claim 1, comprising:
a filter element according to claim 1;
a housing (26) that is substantially concentrically configured relative to said filter element said configured to receive said filter element therein;
a cover (27) closing off said housing (26) and also concentrically configured;
an inlet (28) arranged on said housing and/or said cover, said inlet configured to supply medium to be filtered to said filter element;
an outlet concentrically arranged on said housing (26) and configured to discharge filtered medium from said housing; and
a sealing contour provided on an inner surface of said housing, said sealing contour sealably matching at least one of the said sealing beads (14, 15) and said sealing groove (16).

14. The filter system according to claim 13, wherein said sealing contour on said housing is comprised of two concentric axially extending annular grooves (31, 32); and
a sealing stay ring (33) is arranged between said two annular housing grooves;
wherein said annular grooves at a groove bottom include radially extending ribs (20, 21) extending across said housing grooves; and
wherein said sealing stay (33) has a height that is less than height of said sealing groove (16) of said filter element.

15. The filter system according to claim 13, wherein said housing (26) is includes with an inner wall (49);
wherein a clamping element (50) is provided on said inner wall; and
wherein said clamping element (50) engages against said annular surface (23) of said reinforcement plate, centering said filter element upon insertion into said housing (26).

16. The filter system according to claim 13, further comprising:
a cyclone preseparator (34) is arranged inside said housing between said housing and said filter element; and
a dirt outlet (35) is arranged on said housing (26) or on said cover (27).

17. The filter system according to claim 13, further comprising:
a secondary element (36) arranged inside and secured into said housing, said secondary element arranged at an interior of the filter element, said secondary element closing of said outlet of said housing with a filter media during removal or exchange of said filter element.

18. The filter system according to claim 17, wherein said secondary element (36) is secured to said housing (26) by a threaded connection.

* * * * *